United States Patent [19]
Jennings et al.

[11] Patent Number: 5,710,923
[45] Date of Patent: Jan. 20, 1998

[54] METHODS AND APPARATUS FOR EXCHANGING ACTIVE MESSAGES IN A PARALLEL PROCESSING COMPUTER SYSTEM

[75] Inventors: Andrew T. Jennings, West Chester; Timothy N. Fender, Berwyn; Duane J. McCrory, Malvern; Craig R. Church, Havertown, all of Pa.

[73] Assignee: Unisys Corporation, Blue Bell, Pa.

[21] Appl. No.: 428,684

[22] Filed: Apr. 25, 1995

[51] Int. Cl.[6] ........................................ G06F 9/30
[52] U.S. Cl. ........................ 395/680; 395/200.01
[58] Field of Search ........................ 395/375, 800, 395/377, 706, 670, 677, 680, 200.1

[56] References Cited

U.S. PATENT DOCUMENTS

| | | | |
|---|---|---|---|
| 5,226,131 | 7/1993 | Grafe et al. | 395/375 |
| 5,241,635 | 8/1993 | Papadopoulos et al. | 395/375 |
| 5,353,418 | 10/1994 | Nikhil et al. | 395/375 |
| 5,442,797 | 8/1995 | Casavant et al. | 395/800 |
| 5,499,349 | 3/1996 | Nikhil et al. | 395/375 |

OTHER PUBLICATIONS

S. Sakai, T. Okamoto, Y. Kodama and M. Sato, "Reduced Interprocesor–Communication Architecture for Supporting Programming Models", Programming Models for Massively Parallel Computers, IEEE, pp. 134–143, Dec. 31, 1993.

D.E. Culler, A. Sah, K.E. Schauser, T. von Ericken and J. Wawrzynek, "Fine–grain Parallelism with Minimal Hardware Support: A Compiler–Controlled Threaded Abstract Machine", 4th Int. Conf. Arch. Support for Programming Languages and Op. Sys., pp.164–175, Apr. 8, 1991.

J. Boykin, D. Kirschen, A. Langerman, S. LoVerso, Programming under Mach, Addison–Wesley Publishing Comp., pp. 208–214, 1993.

von Eicken, Thorsten et al., "Active Messages: a Mechanism For Integrated Communication and Computation," 1992 Association For Computing Machinery [1992 ACM 0–89791–509–7/92/0005/0256 ].

*Primary Examiner*—Kevin A. Kriess
*Assistant Examiner*—Sue Lao
*Attorney, Agent, or Firm*—John B. Sowell - ATT; Mark T. Starr - ATT; John F. O'Rourke - ATT

[57] ABSTRACT

A method for communicating active messages among nodes of a parallel processing computer system is disclosed. The active messages are defined by µthreads, and the method comprises the steps of: (a) generating a µthread comprising an instruction pointer, frame pointer, and Local Parameters pointer from a first node to a second node; and (b) performing a procedure on a data structure in accordance with the µthread. The instruction pointer points to an application specific procedure in system memory, and the frame pointer points to an application specific data structure in system memory. The Local Parameters pointer points to one or more words of additional data or parameters stored in memory mapped device registers or system memory.

7 Claims, 5 Drawing Sheets

METHODS AND APPARATUS FOR EXCHANGING ACTIVE MESSAGES IN A PARALLEL PROCESSING COMPUTER SYSTEM

FIELD OF THE INVENTION

The present invention relates generally to computer systems, and more particularly to a simple and efficient interface for use in a computer system employing active messaging.

BACKGROUND OF THE INVENTION

Figure 1:
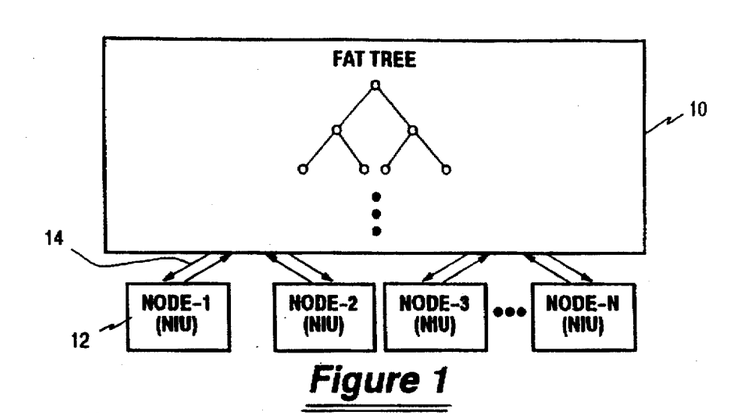
FIG. 1 schematically depicts one embodiment of a parallel processing computing system.

The present invention was developed during the process of designing a massively parallel, high speed computer system of the type depicted schematically in FIG. 1. This system comprises a tree-structured interconnecting network 10 referred to as a "Fat Tree"; a plurality of nodes 12 each containing one or more processors; and a plurality of links 14 connecting the nodes 12 to the Fat Tree 10. The Fat Tree 10 and links 14 permit the nodes to communicate with each other. The present invention particularly relates to methods for communicating active messages among the nodes 12. U.S. patent application Ser. No. 08/428,054 (attorney docket TN024), titled "Message Processor Interface Using Read/ Write Window," filed on even date herewith, discloses inventive features of a Network Interface Unit (NIU) contained within each of the nodes 12.

Figure 2:
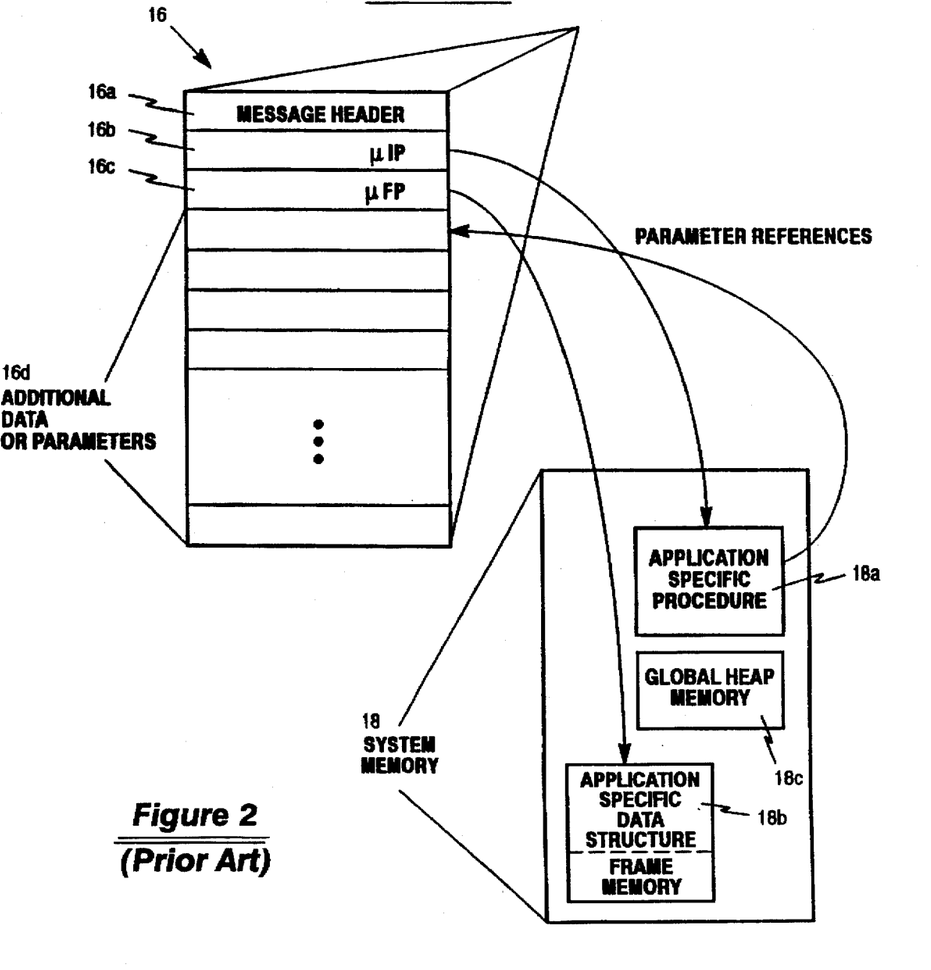
FIG. 2 depicts a typical active messaging model.

Active messaging architectures require a low latency mechanism for creating and dispatching "µthreads" (pronounced microthreads), defined as a system specific description of a unit of work to be executed on a node, which often causes the transmission of a message to another node in order to schedule the work for execution. FIG. 2 depicts a typical active messaging model in which an active message 16 comprises a message header 16a, instruction pointer (µIP) 16b, frame pointer (µFP) 16c, and one or more words of additional data or parameters in a segment 16d of the message. As shown, the instruction pointer 16b identifies an application specific procedure 18a in system memory 18, and the frame pointer 16c identifies an application specific data structure 18b in system memory. The application specific procedure 18a employs various parameters in the segment 16d of the message 16.

Procedures are used in programming languages to describe sequences of operations on data. In object oriented languages (e.g., C++), a data object is implicitly referenced by a procedure. The procedure represents a certain action to be performed on the data object, and parameters may be supplied to the procedure (by the caller) to qualify the exact details of the operation. For instance, there may be a data object of type "FILE" and a member function (i.e., procedure) called "PRINT". The PRINT procedure might accept several parameters (PRINTER, FONT, MARGINS) for use in customizing the operation. For example, the source code statement "f. PRINT (prn1, Courier, Default)" indicates that a FILE object "f" is to be printed on PRINTER "prn1" using the Courier font and the Default margins.

When the procedure is compiled, its source code is converted into a set of machine instructions that represent the equivalent logic. Normally, the instructions associated with a member function (e.g., PRINT) are generated so that they will operate on any instance of a FILE object (e.g., f, g, h) in the system memory space. The usual way of doing this is that operations on the data elements of the object are performed relative to the frame pointer. Each data object would be represented by a different frame pointer. For example, if the name of a FILE were contained within its data object, it might be located ten bytes from the frame pointer (e.g., frame pointer +10).

Threads are employed in parallel processing systems to permit independent instructions within a procedure to execute concurrently. Source code procedures can be compiled to execute on machines that support a thread-based parallel programming model. In the prior art, there is an instruction called "start" that is used to inject the address of the first instruction of a procedure into a token queue. The token queue describes the set of threads ready to execute. The entries in the token queue are called "thread descriptors." A thread descriptor identifies the next instruction to be processed in a particular thread by noting an instruction pointer value. It also identifies a frame of storage locations on which the next instruction acts. This frame is indicated by a frame pointer value that points to the beginning of the frame. Multiple thread descriptors may refer to the same frame; thus, an instruction pointer refers to an instruction for a procedure, and the frame pointer value corresponds to the data object for which the instruction is to take effect.

Figure 3:
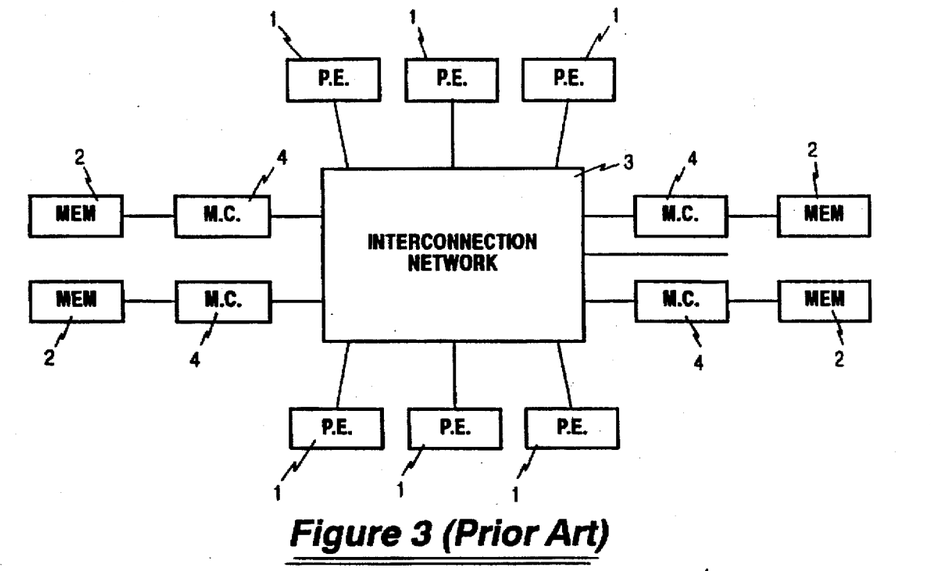
FIG. 3 schematically depicts a prior art data processing system.

An example of a prior art active messaging system is disclosed by U.S. Pat. No. 5,353,418, Oct. 4, 1994, titled "System Storing Thread Descriptor Identifying One Of Plural Threads Of Computation In Storage Only When All Data For Operating On Thread Is Ready And Independently Of Resultant Imperative Processing Of Thread." This patent discloses a data processing system capable of operating on a plurality of threads independently. Referring to FIG. 3 attached hereto, this system includes a plurality of RISC processing elements 1, global heap memory elements 2, memory controllers 4, and an interconnection network 3. The interconnection network 3 routes messages among processing elements 1 and heap memory elements 2. The memory controllers 4 control access to the heap memory elements.

Figure 4:
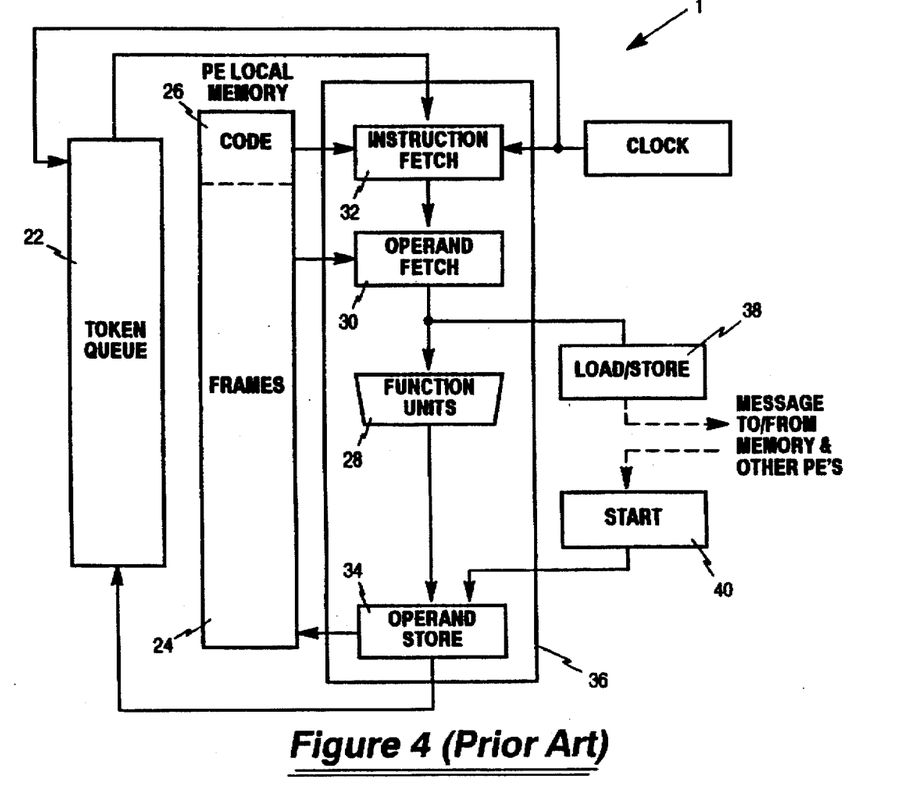
FIG. 4 schematically depicts a processing element of the system of FIG. 3.

FIG. 4 depicts the structure of the disclosed processing elements 1. Each processing element 1 includes a pipelining structure 36 comprising an instruction fetch stage 32 for retrieving instructions from code section 26 of local processing element memory; an operand fetch stage 30 for fetching operands from memory locations 24; a function units stage 28; and an operand store stage 34 for storing in the frames 24 the results of computations performed by the function units 28. Each processing element 1 also includes a token queue 22 that stores thread descriptors for threads of computation to be performed by the processing element 1. When thread descriptors held in the queue 22 are placed into the processing pipeline 36, the next instruction in the thread of computation is performed. The processing elements 1 feed thread descriptors into the pipeline 36 every clock cycle.

The thread descriptors held in the queue 22 and processed by the pipeline 36 identify each thread of computation. As in the model described above and depicted in FIG. 2, each thread descriptor includes an instruction pointer and a frame pointer. The instruction pointer points to a particular instruction held in the code section 26 of the local memory of the processing element, and the frame pointer points to the beginning of a particular frame of memory locations in the frames section 24 of the local memory. When a thread descriptor enters the pipeline 36, its instruction pointer is used to locate a particular instruction in the code section 26 of local memory. The processing pipeline 36 then obtains the appropriate operands for that instruction by referring to the frame pointer, which is used to locate a particular frame held in the frames portion 24 of local memory. The frame pointer points to the beginning of the specified frame, and the addresses held in the operand field of the fetched instruction are used as offsets to locate the memory locations where the desired operands are held. The processing pipeline 36 then performs the desired function specified by the instruction, and then stores the result in the frames portion of local memory. After the result operand is stored, a new thread descriptor for the same thread is placed in the queue 22.

From a high level perspective, including the frame pointer in each token queue entry allows methods to operate on multiple objects simultaneously. For instance, the procedures f.PRINT (prn1, Courier, Default) and g.COPY(dst) could execute concurrently. However, several problems arise when trying to generate code that will allow procedures such as f.PRINT (prn1, Courier, Default) and f.PRINT (prn2, TimesNewRoman, Default) to execute concurrently. The problem lies in the lack of parameter support in the thread model. The "start" instruction of the '418 patent (see col. 9, lines 4 et seq.) effectively becomes the procedure call mechanism. It inserts a new thread descriptor [c] in the destination processing element's token queue 22, and copies a data value [v] into offset [d] of the frame defined by [c]. Thus, the only parameter passing support provided by this system is copying of the data value [v] into offset [d] of the frame defined by the thread descriptor [c].

If a procedure has a single parameter, the data value [v] can be used to supply this parameter. However, if the procedure has multiple parameters, e.g., as in the PRINT example above, the additional data values have to be passed by some other method. One such other method is as follows:

1. The caller allocates memory for the parameters in global heap space.
2. The caller copies the parameter values into global heap space.
3. The caller passes the pointer to the parameters as the value [v] in the "start" instruction.
4. The caller performs instructions associated with the procedure and then deallocates the global heap space associated with the parameters.

Thus, it is possible to pass multiple parameters using the prior art, but at the expense of the overhead of global heap space management.

An additional problem with the prior art is that it is not able to execute the same procedure on different data objects simultaneously without some sort of synchronization. For example, one might expect that it should be possible to execute f.PRINT (prn1, Courier, Default) and f.PRINT (prn2, Courier, Default) concurrently, but it ie not. The difficulty arises because a procedure compiled for the prior art would expect its parameter value to be located at a specific offset [d] in its frame. Assume, for instance, that two different processing elements 1 each executed the four steps given above, and the destination processing element for the "start" instruction was the same in each case. The caller processing elements would each allocate a different portion of global heap memory space for the parameters. Therefore, the data values [v] supplied to the "start" instruction would be different. However, the offset [d] in the "start" instructions would be the same, so the "start" instruction that arrived last at the destination would overwrite the [v] value placed by the first "start" instruction, thereby possibly printing the file the same way twice on the same printer (as opposed to the same file differently on two different printers). One method to avoid this problem is to provide some synchronization on the use of offset [d] in the frame buffer between procedure call invocations. However, synchronization is expensive.

In sum, there are a number of problems with prior art active messaging systems:

First, they are inefficient. Systems of the type disclosed by U.S. Pat. No. 5,353,418 do not permit the user to supply more than one parameter value to a µthread when the µthread is started. In the system disclosed by the '418 patent, all parameters for a µthread must be referenced via the frame pointer, and additional parameters can be passed only through global heap memory. There is a need for a parameter passing mechanism that can be used by systems that do not employ global heap memory.

Furthermore, the system disclosed by the '418 patent employs a processor with built-in support for active messaging instructions, and therefore it will not work with "off-the-shelf" processors not designed for active messaging. (For the purposes of this specification, an "off-the-shelf" processor" is one that was not designed with active messaging instructions.) There is a need for an active messaging system that will work with off-the-shelf processors.

Further, there is a need for an active messaging system that permits parameter passing without requiring the programmer to have specific knowledge of where the parameters are actually stored (e.g., in hardware registers, dedicated or dynamically allocated frame memory, or global heap memory).

SUMMARY OF THE INVENTION

According to the present invention, the synchronization problem discussed above is solved by making a parameter data pointer part of the µthread descriptor, instead of copying data values [v] into offset [d] of the frame memory as in the prior art. This component of the µthread descriptor is referred to herein as the "Local Parameters pointer" (µLP). Since the µLP value is part of the µthread descriptor, it is not shared among multiple µthreads that reference the same frame. Therefore, no synchronization is necessary when passing parameters to procedures invoked using "start"-type instructions.

The present invention will work with an off-the-shelf processor and memory mapped support device (e.g., the Network Interface Unit disclosed in copending application Ser No. 08/428,054 (attorney docket TN024), titled "Message Processor Interface Using Read/Write Window"). The Local Parameters descriptor µLP and associated scheduling routines disclosed herein provide a novel mechanism for interfacing an active messaging support device (e.g., NIU) to an off-the-shelf microprocessor.

In addition, the present invention permits the user to supply more than one parameter value to a µthread when the µthread is started. In the system disclosed by U.S. Pat. No. 5,353,418, all parameters for a µthread must be referenced via the frame pointer, and additional parameters can be passed only through the global heap memory. The Local Parameters pointer µLP disclosed herein can be used by systems that support parameter passing without the use of global heap memory. The Local Parameters pointer µLP also permits specific implementations to abstract the precise details of where the parameters are actually stored.

Other features of the invention are disclosed below.

DETAILED DESCRIPTION OF PREFERRED EMBODIMENTS

Figure 5:
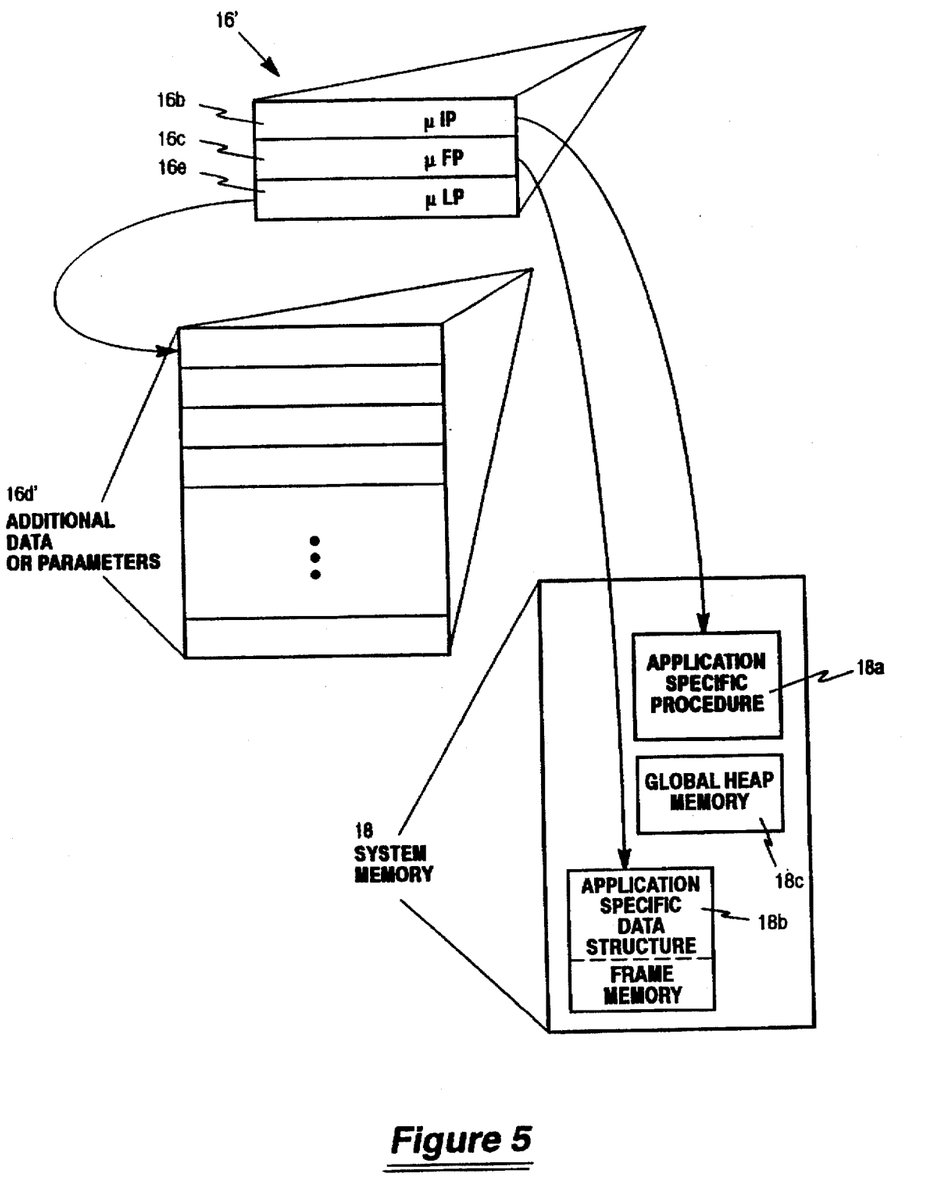
FIG. 5 depicts a model of an active messaging system in accordance with the present invention.

FIG. 5 depicts a model of an active messaging system in accordance with the present invention. As shown, the inventive active messaging system employs an active message 16' comprising an instruction pointer (μIP) 16b, frame pointer (μFP) 16c, and Local Parameters pointer 16e. In addition, the system includes one or more words of additional data or parameters 16d stored in memory mapped device registers or system memory. The instruction pointer 16b identifies an application specific procedure 18a in system memory 18, and the frame pointer 16c identifies an application specific data structure 18b in system memory.

One of the core characteristics of an active-messaging architecture is the way in which an instance of an active-message is referenced (i.e., its μthread descriptor). As discussed above, the prior art includes a descriptor which includes an instruction reference (the instruction pointer) and a global data reference (the frame pointer). The present invention expands on the prior art by adding a local data reference (the Local Parameters pointer). The Local Parameters pointer references the parameters for the operation (referenced by μIP) on the global data (referenced by μFP).

Figure 6:
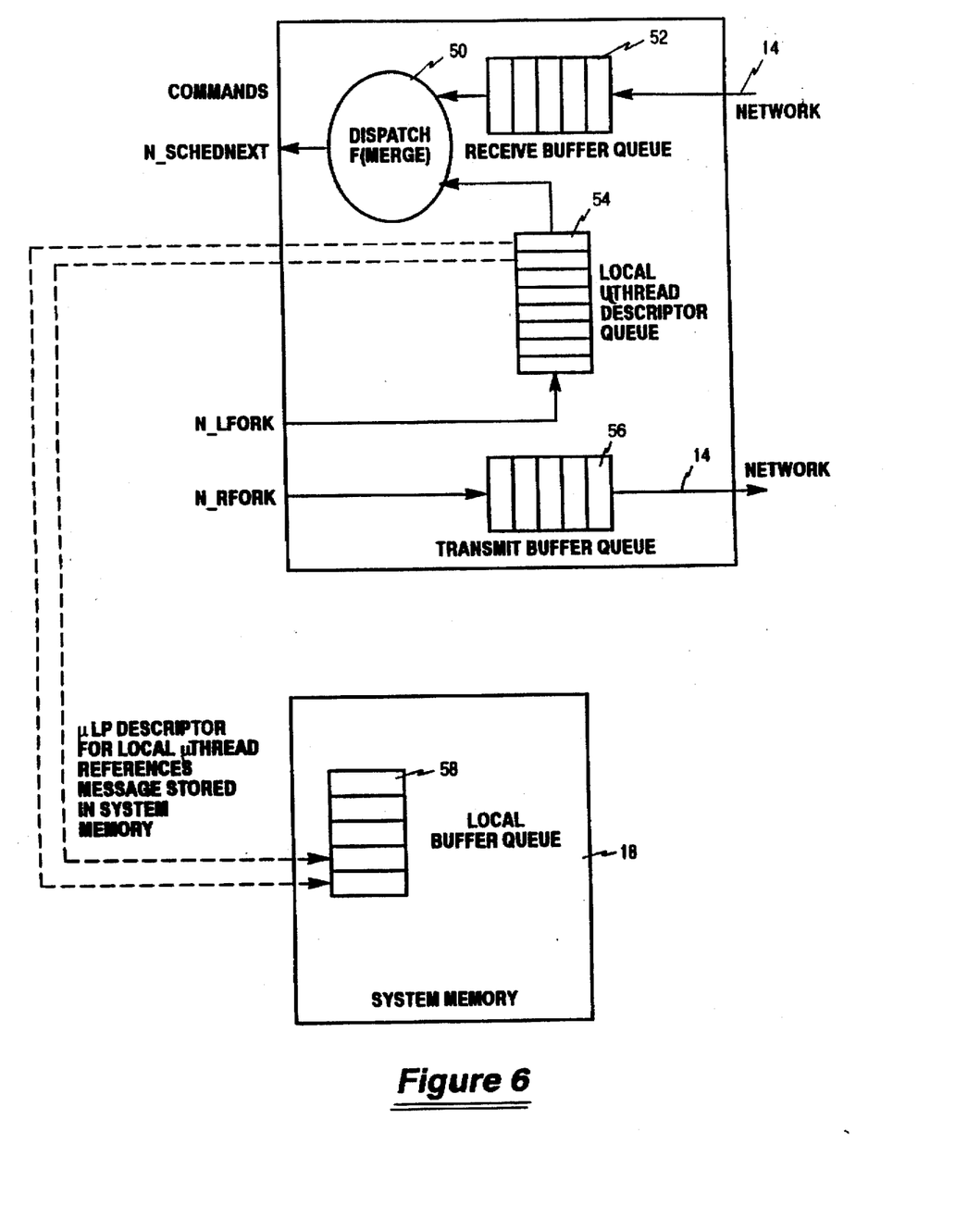
FIG. 6 schematically depicts an optimized local message facility in accordance with the present invention.

FIG. 6 schematically depicts an optimized local message facility comprising a Dispatch object 50, receive buffer queue 52, local μthread descriptor queue 54, transmit buffer queue 56, and local buffer queue 58 (in system memory 18). The Local Parameters pointers for local μthreads point to messages stored in the local buffer queue 58.

Figure 7:
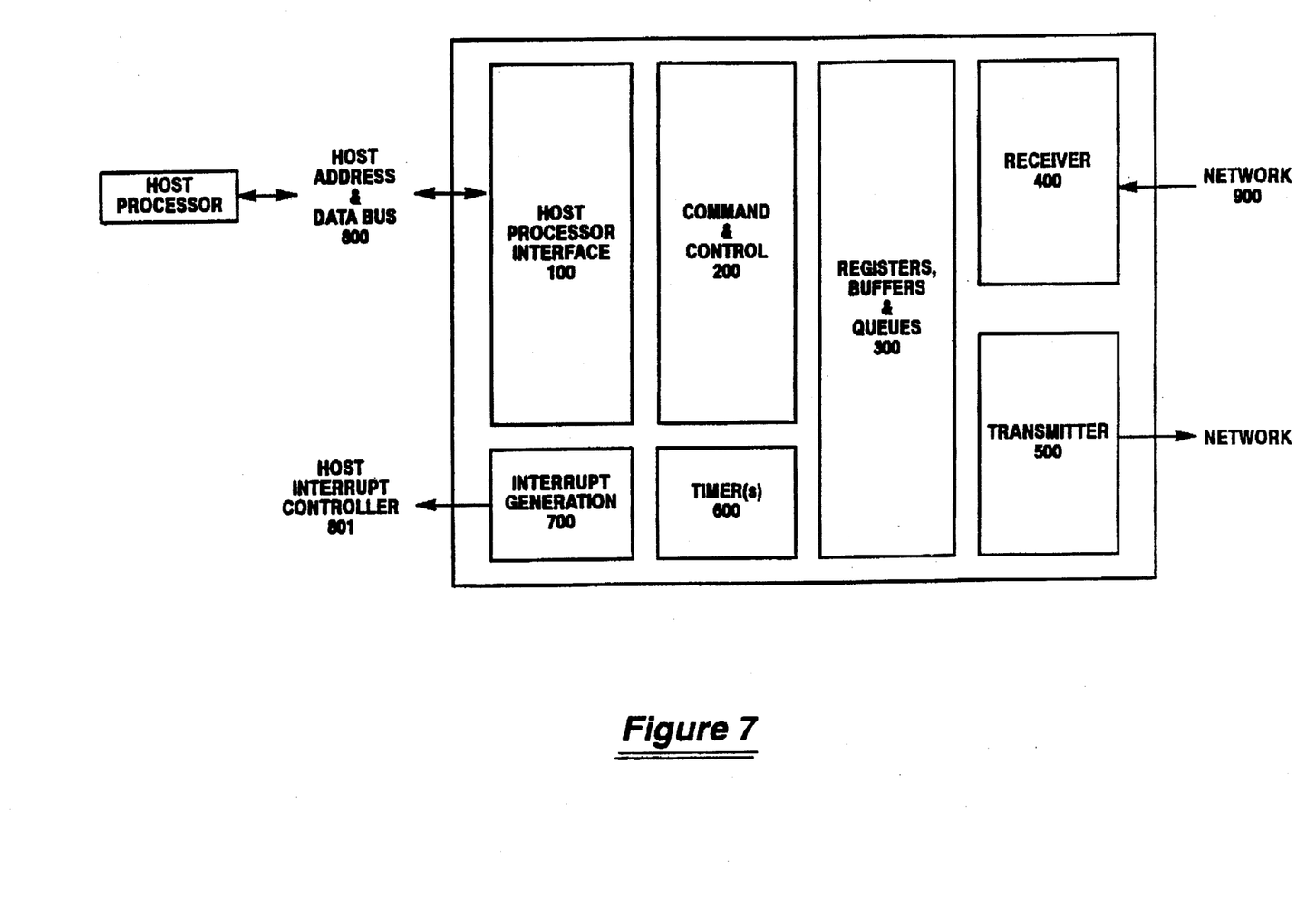
FIG. 7 is a conceptual block diagram of the NIU of each node.

FIG. 7 is a conceptual block diagram of the NIU of each node 12 (FIG. 1), where each node includes the internal structures depicted in FIG. 6. The following discussion explains the operation of the NIU's local message facility.

The receive buffer queue 52, local μthread descriptor queue 54, and transmit buffer queue 56 of FIG. 6 are logically part of the registers, buffers and queues block 300 of FIG. 7. The receiver logic 400 accepts messages from the network at port 900, and informs the command and control logic 200 that a new message has arrived. At this point, the control logic 200 queues the new message on the receive buffer queue 52 (FIG. 6). The transmitter logic 500 sources messages into the network.

When requests to send a message (i.e., the request "$N_{13}RFORK$") arrive from the host interface 100, the command and control logic 200 interrogates the state of the transmitter 500 to determine whether the message must be queued in the transmit buffer queue 56 (FIG. 6), or whether it can be passed immediately to the transmitter 500. If the transmitter 500 is busy sending a message, the command and control logic 200 queues the message in the transmit buffer queue 56 (FIG. 6). When the transmitter 500 is ready to complete sending the previous message, it informs the control logic 200 that it is about to go idle. The control logic 200 allows the transmitter 500 to go idle if the transmit buffer queue 56 (FIG. 6) is empty, or it dequeues a message from the transmit buffer queue 56 (FIG. 6) and passes it to the transmitter 500 so that it can be sent over the network.

When requests to send a message to the local node (i.e., "N_LFORK") arrive from the host interface 100, the command and control logic 200 queues the μthread descriptor associated with the request in the local μthread descriptor queue 54 (FIG. 6).

When requests for a new μthread (i.e., N_SCHEDNEXT command) arrive from the host interface 100, the command and control logic 200 examines the state in the Registers, Buffers and Queues logic 200 in order to determine which μthread descriptor it should return as the N_SCHEDNEXT result to the host interface (100). The Dispatch object (50) performs this function. The Dispatch object in FIG. 6 is a simplified version of the NIU dispatch function which shows that the result for the N_SCHEDNEXT command can be obtained from either the Local μthread descriptor queue (54) or the Receive Buffer Queue (52). When the N_SCHEDNEXT results comes from the Local μthread descriptor queue, the μthread descriptor contains the same exact μIP, μFP and μLP values as were passed by the application when it previously used the N_LFORK command, and the μLP component of the descriptor references the local parameters in system memory. In the case where the N_SCHEDNEXT result comes from the Remote Buffer Queue (52), the pip and μFP component portions of the result μthread descriptor are constructed from the contents of the received message. The parameter portion of the message is made visible via memory mapped registers and the μLP component portion of the result is the address of this memory mapped area within the NIU's memory mapped address space. Therefore, the μLP component does not have to be transmitted between remote nodes, because the receiving NIU can instantiate a μLP value for the corresponding parameters it has made visible in its memory mapped address space.

The addition of the Local Parameters pointer to the μthread descriptor enables the design of a μthread API (Application Programming Interface) that improves the abstraction between the active messaging architecture and the underlying message transport machinery. The invention is an enabling technology for other improvements in active-message handling (e.g., flow control and local μthread optimizations). The underlying message transport machinery can be implemented in hardware, software or a combination thereof. Therefore, improvements can be made to the active messaging machinery that do not impact the application μthreads, because the routines which implement the API are the only ones that need to directly manipulate the message passing machinery.

The μthread API defines the procedure prototype for a μthread routine. It also defines a small number of routines that can be used by μthreads to dynamically create (i.e., forking), terminate and dispatch μthreads. An exemplary μthread API includes the following definitions:

1. μthread procedure prototype: void proc (void *fp, LOCAL_PARAMETERS*lp);
2. A routine to create μthread instances: void fork (void (*ip)(void *fp, LOCAL_PARAMETERS *lp), void *rfp, LOCAL_PARAMETERS *rp, int dest_node);
3. The format of the Local Parameters structure;
4. A routine to terminate the current μthread instance and dispatch the next one: void sched_next().

Optionally, additional variants of "fork" or parameters could be added to implement other features of the message subsystem (e.g., μthread priorities, descriptor sizes). Combinational routines (e.g., "fork" and "sched_next") may also be specified.

The definition of the Local Parameters structure may vary from implementation to implementation. In performance critical implementations, the Local Parameters structure may map closely to the underlying message machinery. Other implementations can choose a more abstract approach and perform transformations between the Local Parameters structure and underlying message machinery at run-time, thus reducing the likelihood that a change to the underlying message machinery will impact the µthreaded application. The Local Parameters structure would normally contain some data space dedicated as local parameters for the operation.

In a preferred embodiment, the Local Parameters structure closely maps to the underlying message machinery. The application µthread is used to set the length of the message in the Local Parameters structure prior to invoking the fork routine.

The µthread API routines do not de-reference the µFP value to access data. Therefore, the µthread application may use the µFP as a value. It need not reference actual memory. Although the µthread API is geared to operate most efficiently on memory mapped messaging hardware (e.g., an NIU), it can also be applied to register based messaging hardware. Thus, it can be used as a common framework to port active messaging based implementations between different hardware messaging systems.

In the typical active messaging system depicted in FIG. 2, application specific active messaging procedures reference the additional data or parameters in a message directly. Thus, all parameter data for an active message exist in the message passing hardware. In the system depicted in FIG. 5, the active messaging hardware logically separates the µthread descriptor from the additional data or parameters in the message. This logical separation is an enabling feature for additional improvements in active messaging implementations. Improvements made possible by this feature include:

1. Dynamic sizing of µIP and µFP values. The messaging hardware can interpret data in the message header to determine the actual size of the µIP and µFP values passed in an active message. These values can be zeroed extended (if necessary) and placed in the active message descriptor registers. For instance, some implementations may support the coexistence of 32bit or 64bit descriptor values. The active message descriptors would always be implemented as the maximum size. If a message arrives that has 32bit descriptors, these are zero filled to create the correct 64bit value. Thus, the dispatch of the next µthread procedure can be made without software having to analyze the message contents. A 32bit active message implementation can use the data space that would be consumed by the larger 64bit µIP and µFP values as application specific data or parameters. A 64bit active message implementation has the advantage of a larger logical address space.

2. Support for non-µthreaded messages. Sometimes an application may require message passing independent of active messaging (e.g., when a node is booting). The invention allows the application to still be implemented using active messaging design techniques. When a message arrives and its message header indicates that the message is not an active message (i.e., not a µthread), then the messaging hardware can supply a µIP and a µFP value which was configured by the application.

3. Parameter support for active message based interrupts. Messaging hardware can be implemented such that µIP, µFP, and µLP values can be assigned to a particular interrupt. When that interrupt occurs and the application fetches the next active message descriptor from the messaging hardware, the application will be given the µIP, µFP and µLP values for the interrupt. Depending on the specific implementation, the µLP value may point to a parameter structure set up previously in system memory or it may point back into some other memory mapped device that is supplying the additional data/parameters for the interrupt.

4. Optimized local message passing facility. In active-messaging based systems, an end-point often needs to schedule a message to execute on its own (i.e., local) node. Most active-messaging systems would accomplish this by sending a message into the message network. The network would route the message back to the sending node (since the source and destination nodes for a local message are logically identical). Network bandwidth can be conserved by having the end-point device (e.g., NIU) provide resources to loopback local messages without actually sending them into the network. To support this, the end-point device needs (a) buffer space to hold the local messages, and (b) a mechanism to merge the local messages with those that have arrived from the network. The µLP component of the µthread descriptor allows the end-point device to conserve valuable hardware buffer resources because the actual message contents for a local message need not be buffered in the end-point device.

In the preferred embodiment, the NIU provides buffering only for the µthread descriptor of local messages. The software stores the local message in memory on the local node. The µLP component for a local message is the memory address of the stored message. The NIU returns the active µthread descriptor for the local message when it is dispatched by the scheduling function (N_SCHEDNEXT).

The µthread dispatch routine does not have to know whether the end-point has dispatched a local µthread or a µthread that was received from the network (i.e., a remote µthread) because the µLP always points to where the message is in memory. For remote messages, the µLP value will point to the memory mapped NIU address space. For local µthreads, the µLP value will point to the memory space allocated by software to hold the message. The software employs a circular buffer of messages to store the local messages. No special action is required to free a message as long as the software and end-point device operate with the same queuing strategy (e.g., first in first out).

There are significant differences between the prior art and the present invention in terms of their basic execution models. For example, in the system disclosed by U.S. Pat. No. 5,353,418, the processor provides direct support for µthreads at its instruction level, i.e., through the "fork", "join" and "start" instructions. Furthermore, special forms of "load" and "store" are employed to send and receive memory requests to/from global heap memory elements. Messages are formed automatically by the instruction processor as a result of executing a "load", "store" or "start" instruction. The present invention provides procedure based, as opposed to instruction based, implementations of "fork", "join" and "start" primitives. In contrast to the system disclosed by the '418 patent, with the present invention iterations between the processor and the support device (e.g., Network Interface Unit) do not necessarily occur on every instruction. With the present invention, a µthread retains exclusive control of a processor (and no other µthread executes on that processor) until the µthread explicitly terminates itself.

There are also significant behavioral differences between the prior art and the present invention. In the prior art system disclosed by the '418 patent, a "start" instruction terminates the current μthread and creates a new μthread on any node, but only one unit of information (e.g., the scalar size of a "store" result) can be passed directly to the new μthread. Therefore, to send multiple units of information to a new μthread, the creating μthread (the one doing the "start") would have to store and possibly allocate data in global heap memory. The "store" associated with the "start" would be of the memory address of the global heap memory data. In the present invention, the "fork" procedure serves the same function as the "fork" and "start" instructions of the '418 patent, in that it is used to create a new μthread on the same or a different processor. However, with the present invention, the number of units of information which can be passed directly to the new μthread is limited only by the capabilities of the underlying messaging network. It is important to note that, with the present invention, the forking μthread need not allocate space in the receiving node's memory for the message since the message is memory mapped by the support device (e.g., the NIU). Note also that the Local Parameters pointer μLP is employed to reference the contents of the message.

Finally, the present invention may be employed in other specific forms without departing from the spirit or essential attributes thereof. Accordingly, reference should be made to the appended claims rather than to the foregoing specification as indicating the true scope of the invention.

We claim:

1. A method for communicating active messages among nodes of a parallel processing computer system, said active messages being defined by μthreads, comprising the steps of:

(a) generating a μthread descriptor comprising an instruction pointer (μIP) and flame pointer (μFP);

(b) generating a Local Parameters pointer (μLP) after said node receives said active message, wherein said Local Parameters pointer (μLP) identifies where additional parameters have been stored and is included as part of said μthread descriptor; and (c) performing a procedure identified by said instruction pointer (μIP) on a data structure identified by said frame pointer (μFP) in accordance with said μthread;

wherein said procedure uses said Local Parameters pointer (μLP) to locate additional parameters associated with said procedure.

2. A method as recited in claim 1, wherein said additional parameters are stored in memory mapped device registers.

3. A method as recited in claim 1, wherein said additional parameters are stored in system memory.

4. A method as recited in claim 1, wherein said additional parameters are stored in dedicated frame memory.

5. A method as recited in claim 1, wherein said additional parameters are stored in dynamically allocated frame memory.

6. A method as recited in claim 1, wherein said additional parameters are stored in global heap memory.

7. A method as recited in claim 1, wherein said method is carried out by an off-the-shelf processor not designed with active messaging instructions.

* * * * *